United States Patent
Breuer (10) Patent No.: US 7,640,489 B2
(45) Date of Patent: Dec. 29, 2009

(54) METHODS AND SYSTEMS FOR INPUTTING DATA INTO SPREADSHEET DOCUMENTS

(75) Inventor: Matthias Breuer, Seevetal (DE)

(73) Assignee: Sun Microsystems, Inc., Santa Clara, CA (US)

( * ) Notice: Subject to any disclaimer, the term of this patent is extended or adjusted under 35 U.S.C. 154(b) by 1494 days.

(21) Appl. No.: 09/921,224

(22) Filed: Aug. 1, 2001

(65) Prior Publication Data

US 2002/0055954 A1    May 9, 2002

Related U.S. Application Data (60) Provisional application No. 60/295,709, filed on Jun. 4, 2001.

(51) Int. Cl.
*G06N 3/00*      (2006.01)
(52) U.S. Cl. ..................................... 715/212
(58) Field of Classification Search ................ 715/503, 715/509, 513, 523, 517, 530, 212; 345/440
See application file for complete search history.

(56) References Cited

U.S. PATENT DOCUMENTS

| | | | |
|---|---|---|---|
| 5,339,410 A | | 8/1994 | Kanai |
| 5,603,021 A | | 2/1997 | Spencer et al. |
| 5,799,295 A | | 8/1998 | Nagai |
| 5,926,822 A | * | 7/1999 | Garman ............ 715/503 |
| 6,006,239 A | * | 12/1999 | Bhansali et al. ............ 707/201 |
| 6,185,582 B1 | * | 2/2001 | Zellweger et al. ........... 715/503 |
| 6,691,281 B1 | * | 2/2004 | Sorge et al. ............ 715/503 |

FOREIGN PATENT DOCUMENTS

| | | |
|---|---|---|
| WO | 0005658 | 2/2000 |
| WO | 0016178 | 3/2000 |

* cited by examiner

*Primary Examiner*—Kyle R Stork
(74) *Attorney, Agent, or Firm*—Sonnenschein Nath & Rosenthal LLP (57) ABSTRACT

Methods, systems, and articles of manufacture consistent with the present invention enable a user to input data into a document having cells arranged in columns and rows. A first of the cells and a second of the cells each have an original content. The original content of the first cell is overridden with a first user inputted value. The cells are recalculated based on the first user inputted value. After recalculating the cells based on the first user inputted value, the original content of the second cell is overridden with a second user inputted value. The cells are recalculated based on the second user inputted value. The original content of the first cell is automatically restored based on a user input such that the second user inputted value is maintained in the second cell.

3 Claims, 10 Drawing Sheets

|   | A | B | C | D | E |
|---|---|---|---|---|---|
| 1 | 5 | B1=A1-2 | C1=B1/A1X100 | D1=0.9XC1 |   |
| 2 |   | 4 | 6 |   |   |
| 3 |   |   |   |   |   |
| 4 |   |   |   |   |   |

500 (table)
510 (cell B2)
520 (cell C2)

METHODS AND SYSTEMS FOR INPUTTING DATA INTO SPREADSHEET DOCUMENTS

CROSS-REFERENCE TO RELATED APPLICATIONS

The following identified U.S. and foreign patent applications are relied upon and are incorporated by reference in this application:

European Patent Application No. 00116615, entitled "METHOD AND APPARATUS FOR INPUTTING DATA INTO SPREADSHEET DOCUMENTS", filed on Aug. 1, 2000; and U.S. Provisional Patent Application No. 60/295,709, entitled "METHOD AND APPARATUS FOR INPUTTING DATA INTO SPREADSHEET DOCUMENTS", filed on Jun. 4, 2001.

FIELD OF THE INVENTION

The present invention relates to the input of data into an electronic document comprising cells, and in particular the invention relates to the input of data into spreadsheet documents.

BACKGROUND OF THE INVENTION

Apart from word processing applications software, spreadsheet software is currently one of the most commonly used software tools. A spreadsheet program allows the user to input data into cells, which are arranged into columns and rows, and by providing calculation tools it enables the user to easily evaluate data that can be arranged in a table form. Such an evaluation can be done by calculating the values of cells by referring to the content of other cells, or it can be done by graphically displaying the content of the spreadsheet document, or by a combination of these methods.

Figure 1:
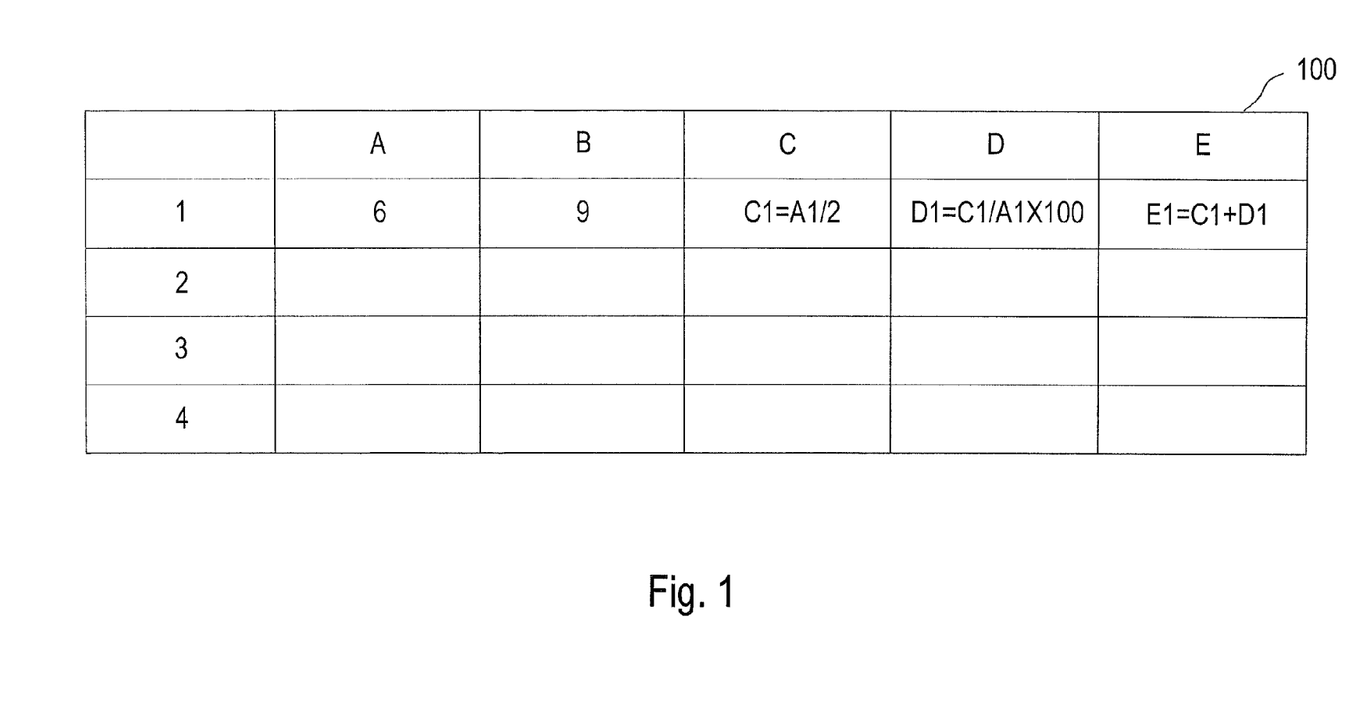
FIG. 1 depicts an example of a spreadsheet.

In typical spreadsheet programs, the user is provided with a graphic display of a table of a spreadsheet 100 similar to the one schematically illustrated in FIG. 1. In the example of FIG. 1, the table data is arranged in cells, which are arranged in columns labeled "A" to "E" and rows numbered from "1" to "4". A user can also enter data into the individual cells, such as for example the number "6" shown in the cell "A1".

Apart from the graphic visualization tools provided by spreadsheet programs, probably the most important feature which such spreadsheet programs offer to the user is the possibility to calculate the content of the individual cells by referring to other cells. Known spreadsheet programs such as Excel™ produced by Microsoft Corporation, or StarCalc™ produced by Sun Microsystems, Inc. provide the possibility to enter, for individual cells, functions or formulas which define how the content of those cells is to be derived by referring to the content of other cells. For that purpose, usually on the graphical user interface, there is some location where the user can define the reference and the function or formula for the individual cells. For the sake of simplicity, in FIG. 1 the formulas defining the references are shown directly in the individual cells. Sun, Sun Microsystems, the Sun logo, and StarCalc are trademarks or registered trademarks of Sun Microsystems, Inc. in the United States and other countries. All other company and product names may be trademarks of their respective companies.

After having input such references, the content of the so defined cells (for example, cells C1, D1, and E1 in the example of FIG. 1) is automatically calculated by the spreadsheet program by referring to the content of the referenced cells.

One problem involved with this type of spreadsheet data input mechanism is that once a formula or a function referencing one cell to another has been input, the thereby defined cell content is fixed in the sense that it only depends on the content of the cell which it references, however, there is no possibility to directly influence the content of the individual cell which is defined by a formula or a function except by overriding the formula.

For example, assume that cell "B1" references cell "A1", that cell "C1" references cell "B1", that cell "D1" references cell "C1", and so forth, until cell "H1" references cell "G1". In such a case, where there is a linear chain of references, it is only possible to amend the content of cell "A1" and to then observe how the other cells change their content depending on the change of the content of cell "A1". A user might, however, desire to observe how the content of cell "D1", for example, changes if cell "C1" assumes a particular value. This, however, is not possible since all cells from cell "B1" to cell "H1" can typically only change their content in response to a change of the content of cell "A1".

Thus, typical spreadsheet programs fail to provide the user with a sufficiently flexible input interface.

SUMMARY OF THE INVENTION

Methods, systems, and articles of manufacture consistent with the present invention enable a user to enter values into cells of a spreadsheet document that temporarily override the existing formulas in those cells. This allows the user to determine how the entered values affect other cells of the spreadsheet document that reference the modified cell. For example, if a first cell contains a formula for computing a total sale price and a second cell contains a formula for computing sales tax based on the total sale price in the first cell, the user can observe the affect on the sales tax in the second cell by entering a numerical value, such as "100", into the first cell. The formula in the first cell is not replaced by the numerical value, it is merely temporarily overridden until the user requests that the original formula be restored. When the user makes such a request, the system automatically restores the formula of the cell so that it is used in the next calculation.

Additionally, methods, systems, and articles of manufacture consistent with the present invention overcome the shortcomings of the related art by providing a more flexible user interface for programs, which allow a user to calculate a content of a cell of a table by referencing any other cell of the table. Such methods, systems, and articles of manufacture provide an option to a user that enables the user to input data directly into cells of a document, the content of the cells are defined by referencing another cell. The references can be, for example, functions or formulas. With this option, the user can determine how an amendment of a content of an individual cell affects the content of other cells, which reference the individual cell, without deleting the reference of said individual cell to another cell.

The option can be implemented in a spreadsheet program. Alternatively, the option can be implemented into any program allowing the user to calculate the content of a cell of a table by referencing any other cell of said table. In another embodiment, there is carried out an automatic calculation of the contents of the other cells after the user has entered the data into the individual cell by using said option. This makes it easy to follow the changes of the contents of the other cells in dependence of the manually inputted value entered directly into the individual cell. In yet another embodiment, the option is provided in the case where the cell into which the data is to be inputted forms part of a circular reference. This assures that all cells contained in the circular reference contain self-consistent data after inputting the new data by using the input option, since the content of all cells will be recalculated after manually inputting the new data, so that after the recalculation the cells forming the circular reference contain data which again is fully self-consistent.

In accordance with methods consistent with the present invention, a method in a data processing system is provided for enabling a user to input data into a document comprising cells arranged in columns and rows. A first of the cells and a second of the cells each have an original content. The method comprises the steps of overriding the original content of the first cell with a first user inputted value; recalculating the cells based on the first user inputted value; after recalculating the cells based on the first user inputted value, overriding the original content of the second cell with a second user inputted value; recalculating the cells based on the second user inputted value; and automatically restoring the original content of the first cell based on a user input such that the second user inputted value is maintained in the second cell.

In accordance with methods consistent with the present invention, a method in a data processing system comprising a document with cells arranged in rows and columns, each cell comprising a formula and a last result, is provided. The method comprises the steps of: receiving a plurality of values for a plurality of the cells; and storing the values in the last result of the plurality of the cells such that the values are used during recalculation instead of the formulas and such that each of the formulas for the plurality of the cells can be restored independently of other of the plurality of cells.

In accordance with systems consistent with the present invention, a data processing system is provided. The data processing system comprises a secondary storage device comprising a document having cells arranged in columns and rows, a first of the cells and a second of the cells each having an original content. The data processing system comprises a memory comprising a computer program that overrides the original content of the first cell with a first user inputted value, recalculates the cells based on the first user inputted value, overrides the original content of the second cell with a second user inputted value after recalculating the cells based on the first user inputted value, recalculates the cells based on the second user inputted value, and automatically restores the original content of the first cell based on a user input such that the second user inputted value is maintained in the second cell. The data processing system comprises a processing unit that runs the computer program.

In accordance with articles of manufacture consistent with the present invention, a computer-readable medium is provided. The computer readable medium contains instructions that cause a data processing system to perform a method for enabling a user to input data into a document comprising cells arranged in columns and rows. A first of the cells and a second of the cells each have an original content. The method comprises the steps of: overriding the original content of the first cell with a first user inputted value; recalculating the cells based on the first user inputted value; after recalculating the cells based on the first user inputted value, overriding the original content of the second cell with a second user inputted value; recalculating the cells based on the second user inputted value; and automatically restoring the original content of the first cell based on a user input such that the second user inputted value is maintained.

In accordance with articles of manufacture consistent with the present invention, a computer-readable medium is provided. The computer readable medium contains instructions that cause a data processing system to perform a method in a data processing system comprising a document with cells arranged in rows and columns, each cell comprising a formula and a last result. The method comprising the steps of: receiving a plurality of values for a plurality of the cells; and storing the values in the last result of the plurality of the cells such that the values are used during recalculation instead of the formulas and such that each of the formulas for the plurality of the cells can be restored independently of other of the plurality of cells.

In accordance with articles of manufacture consistent with the present invention, a computer-readable memory device encoded with a data structure with entries is provided. Each entry reflects a cell in a spreadsheet that is recalculated by a spreadsheet program which is encoded in the memory device and which is run by a processor. Each cell comprises a first storage area that stores a formula, and a second storage area that stores a numerical value that temporarily overrides the formula so that the numerical value is used instead of the formula during recalculation.

The above-mentioned and other features, utilities, and advantages of the invention will become apparent from the following detailed description of preferred embodiments of the invention together with the accompanying drawings.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with methods, systems, and articles of manufacture consistent with the present invention as illustrated in the accompanying drawings. Wherever possible, the same reference numbers will be used throughout the drawings and the following description to refer to the same or like parts.

Figure 2:
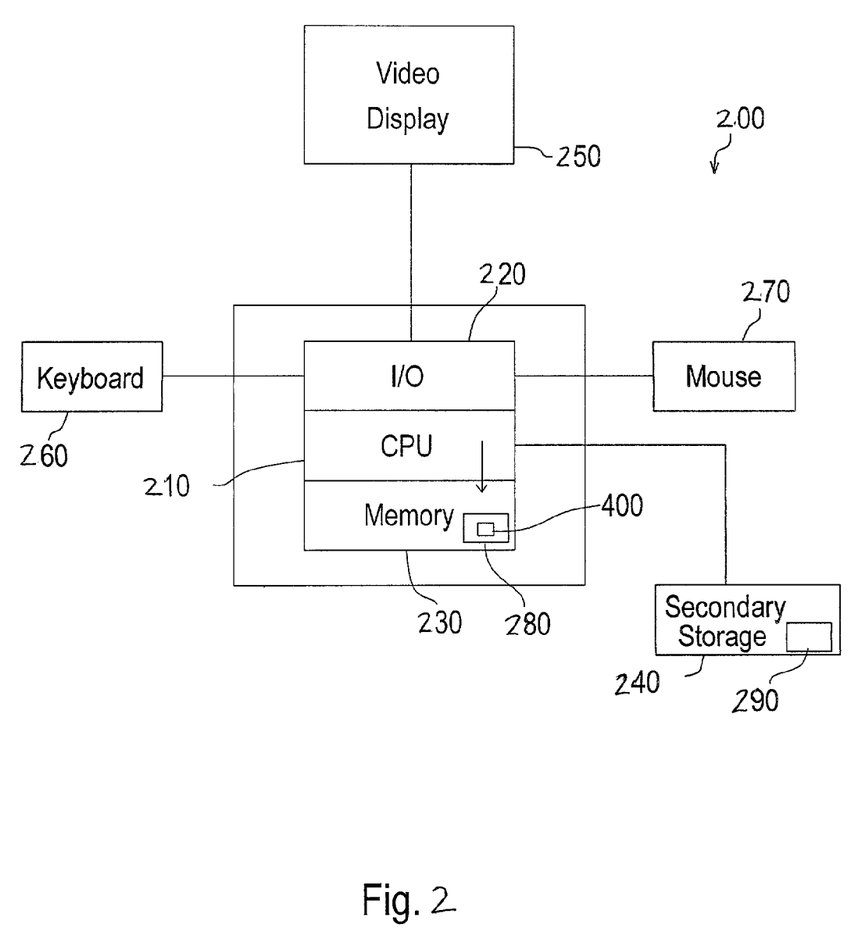
FIG. 2 depicts a block diagram of a data processing system with which embodiments of the present invention may be implemented.

FIG. 2 depicts a block diagram of a data processing system 200 suitable for practicing methods and implementing systems consistent with the present invention. The data processing system 200 comprises a central processing unit (CPU) 310, an input output I/O unit 220, a memory 230, a secondary storage device 240, and a video display 250. The data processing system 300 may further comprise standard input devices such as a keyboard 360, a mouse 370 or a speech processing means (not illustrated).

Figure 5:
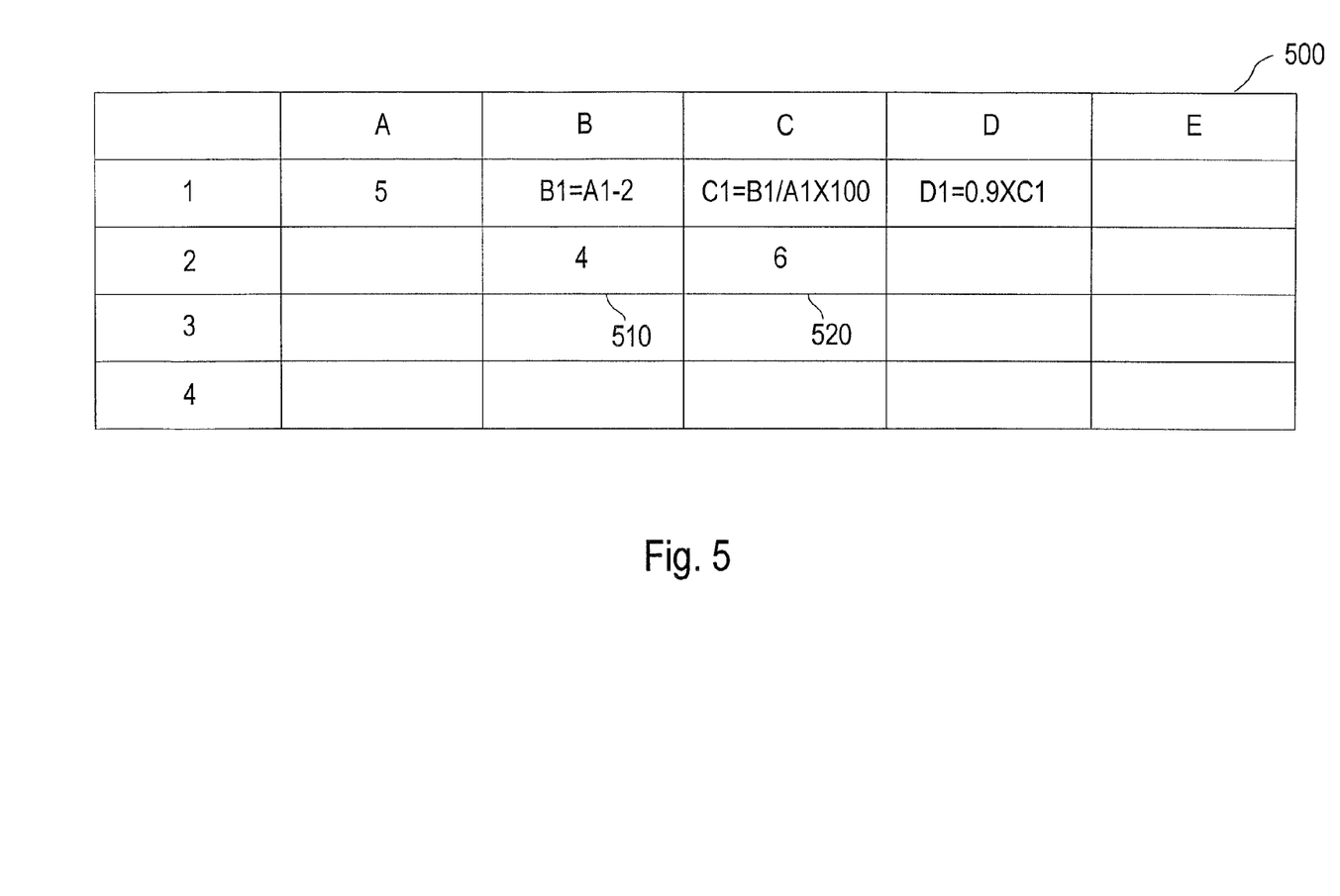
FIG. 5 depicts an example of data input into a spreadsheet in accordance with methods, systems, and articles of manufacture consistent with a first embodiment of the present invention.

The memory 230 contains a computer program 280, such as a spreadsheet program. The computer program 280 provides an interface for inputting data values into cells of a spreadsheet document and for making user selections via the keyboard 260. An example of a spreadsheet 500 is depicted in FIG. 5 and will be described below. The values of the cells of the spreadsheet 500 are viewed on the video display 250.

Although aspects of one implementation are depicted as being stored in memory 230, one skilled in the art will appreciate that all or part of Systems and methods consistent with the present invention may be stored on or read from other computer-readable media 290, such as secondary storage devices, like hard disks, floppy disks, and CD-ROM; or other forms of ROM or RAM either currently known or later developed. Further, although specific components of data processing system 200 are been described, one skilled in the art will appreciate that a data processing system suitable for use with methods, systems, and articles of manufacture consistent with the present invention may contain additional or different components.

Figure 3:
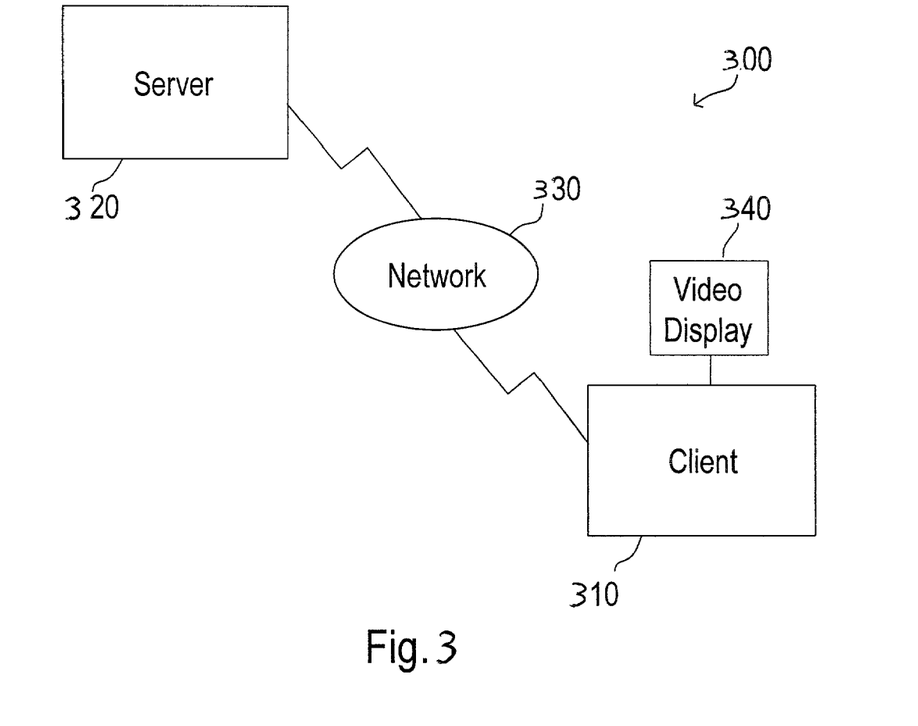
FIG. 3 depicts a block diagram of a client-server based data processing system with which embodiments of the present invention may be implemented.

One skilled in the art will appreciate that methods and systems consistent with the present invention may also be implemented in a client-server environment, like the one depicted in FIG. 3. FIG. 3 depicts a block diagram of a client-server based data processing system 300 in which methods, systems, and articles of manufacture consistent with the present invention may be implemented. A client computer system 310 and a server computer system 320 are each connected to a network 330, such as a Local Area Network, Wide Area Network, or the Internet. A spreadsheet document is displayed on a video display 340 of the client computer system 310 while some or all of the processing as described below is carried out on the server computer system 320, which is accessed by the client computer system 310 over the network 330.

Figure 4:
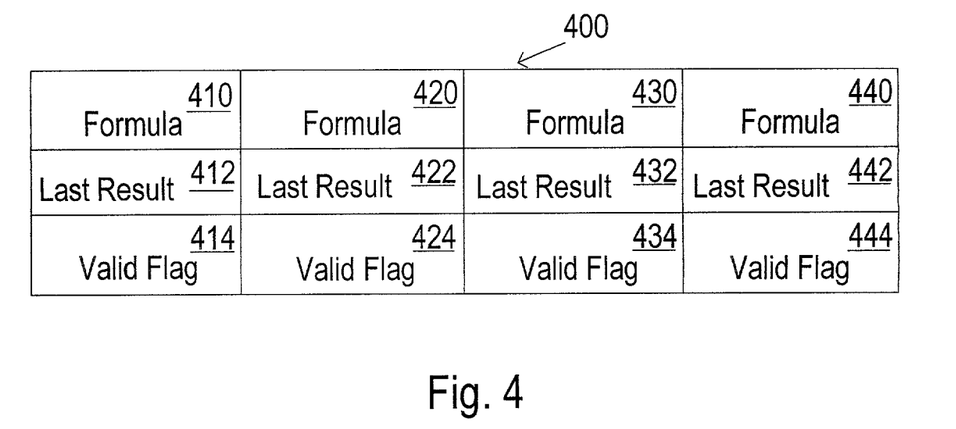
FIG. 4 depicts a block diagram of a data structure with which embodiments of the present invention may be implemented.

Referring back to FIG. 2, the computer program 280 includes a data structure 400 having entries reflecting each of the cells of the spreadsheet 500. FIG. 4 depicts a more detailed diagram of data structure 400. The sample data structure 400 that is depicted in FIG. 4 reflects a spreadsheet having four cells across a single row. For each cell in the row, such as cell "A1" in FIG. 5, the data structure 400 has entries for a formula 410 in cell "A1", a last result 412 of the formula, and a valid flag 414 indicating whether the last result does not need recalculation. Each of the cells is similarly configured. The valid flag 414 is set to "valid" when the last result does not need to be recalculated and is set to "invalid" when the last result needs to be recalculated. For example, whenever a change is made to cells of the spreadsheet 500, the computer program 280 sets the valid flags of all cells comprising formulas that reference the changed cells to "invalid" indicating that the last results of the referencing cells need recalculation.

Figure 6:
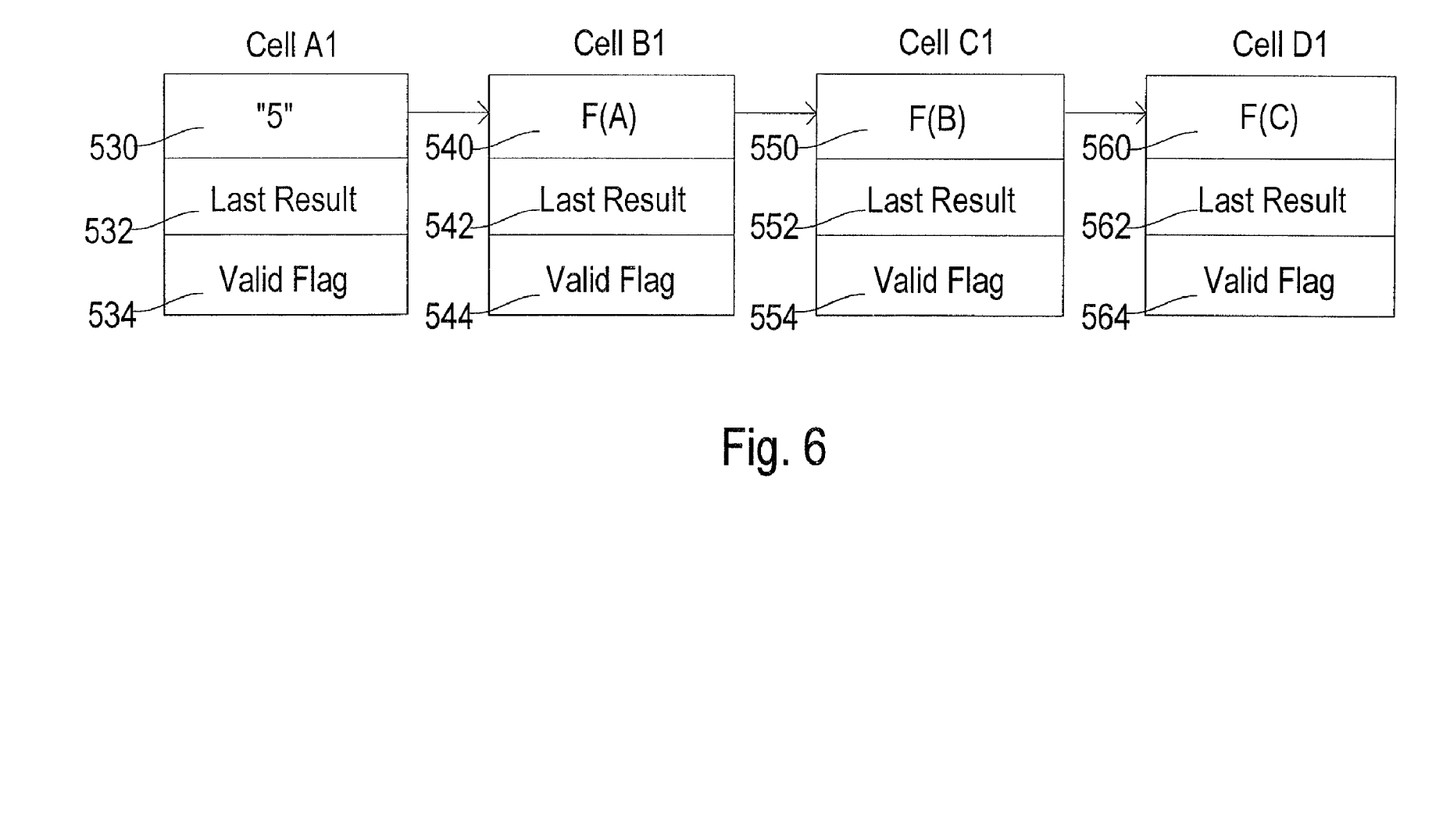
FIG. 6 depicts the dependencies of the individual cells of FIG. 5 in more detail in accordance with methods, systems, and articles of manufacture consistent with the present invention.

The spreadsheet 500, when displayed on the video display 250 and which is depicted generally in FIG. 5, comprises cells "A1", "B1", "C1" and "D1" that each contain a formula. FIG. 6 depicts the data structure representing cells "A1", "B1", "C1" and "D1" in more detail. In the illustrated example, cell "A1" comprises a formula 530, a last result 532, and a valid flag 534. Cell "B1" comprises a formula 540, a last result 542, and a valid flag 544. Cell "C1" comprises a formula 550, a last result 552, and a valid flag 554. Cell "D1" comprises a formula 560, a last result 562, and a valid flag 564. The formula 530 of cell "A1" contains a fixed value "5", and the formulas of cells "B1", "C1", and "D1", which each contain references which define the content of those cells "B1", "C1", and "D1" by referencing their respective neighbor cell to their left. The formula 540 of cell "B1" is defined as being equal to the content of cell "A1" minus "2", because formula 540 corresponds to the formula depicted in cell "B1" in FIG. 5. The formula 550 of cell "C1" is defined as the percentage of the content of cell "B1" in relation to the content of "A1", because formula 550 corresponds to the formula depicted in cell "C1" in FIG. 5. The formula 560 of cell "D1" is defined as the content of cell "C1" multiplied by "0.9", because formula 560 corresponds to the formula depicted in cell "D1" in FIG. 5.

In accordance with methods, systems, and articles of manufacture consistent with the present invention, the user can observe how the contents of cells, which reference a particular cell, change when a user directly inputs data into that particular cell, without deleting a reference to a cell already present in that particular cell. For example, the user can observe how the contents of cells "C1" and "D1" change if cell "B1" assumes a numerical value, for example "4", inputted by the user.

The computer program 280 calculates for cell "B1" a last result of "3", which, according to the formula in cell "B1", is the content of cell "A1" (or "5") minus "2". In response to a request received from the user, such as a click on the mouse 270 and a selection of a corresponding menu item on the video display 250, the computer program 280 provides the user with an input option to directly input a data value into cell "B1", which already contains a reference definition in its formula 540. After receiving the request by the user, the computer program 280 opens an input field 510, which is highlighted and which enables the user to directly input a numerical value. In the example illustrated in FIG. 5, the computer program receives, from the user, an inputted value "4", which the computer program 280 directly enters into cell "B1". Entry of the inputted value into cell "B1", however, does not replace the formula 540 already present in cell "B1" because the computer program 280 stores the inputted value "4" as the last result 542 of cell "B1". Thus, as discussed below, the formula 540 can be easily restored.

In the example depicted in FIG. 5, the computer program 280 opens the input field 510 in a pop-up cell on the video display 250. The input field 510 however can be opened in any means suitable for data entry, such as in an input window, data entry line on the video display 250, or an empty cell of the spreadsheet document 500.

After the computer program 280 enters the user's inputted value into cell "B1", the computer program 280 recalculates the contents of the cells "C1" and "D1" based on the last result 542 of cell "B1" being "4" instead of "3", as their respective formulas 550 and 560 reference cell "B1". The user can thereby monitor how the contents of other cells "C1" and "D1" which reference the certain individual cell "B1" into which a numerical value has been directly inputted are affected by this input. This feature can be desirable in many circumstances, such as, when an evaluation is to be performed on how certain percentage values affect other parameters calculated in complex spreadsheet documents.

In response to a further request by the user, the computer program 280 provides the user with an input option to directly input a data value into cell "C1", which also already contains a reference definition in its formula 550. After the receiving the request by the user, the computer program 280 opens an input field 520, which is highlighted and which enables the user to input a data value for entry into cell "C1". In the example illustrated in FIG. 5, the computer program 280 enters a value "6" into cell "C1" based on the user's input. Entry of the value "6" into cell "C1" by the computer program 280, however, does not replace the formula 550 already present in cell "C1" because the computer program 280 stores the inputted value as the last result 552 of cell "C1" so the value "6" only temporarily overrides the formula 550 until the formula 550 is restored.

After the data value is entered into cell "C1", the computer program 280 recalculates the content of cell "D1" based on the last result 552 of cell "C1" being "6", because the formula 560 of cell "D1" references cell "C1". The user can thereby monitor how the contents of other cells "D1", which reference the certain individual cell "C1" into which a value has been directly inputted, are affected by this input.

Accordingly, the directly inputted values override the original contents of the respective cells when the computer program 280 performs further calculations, however the original contents of the cells can be restored, because the computer program 280 stores the directly inputted values as last results of the cells instead of as formulas of the cells. Thus, the computer program 280 provides the user with the ability to automatically restore an original content of a cell in any sequence, regardless of whether recalculations have been performed or whether the user has directly inputted data values into other cells. Values that have been directly inputted into other cells, even values that have been directly inputted after the directly inputted value of the cells whose original content is restored, are maintained.

The computer program 280 provides the user with an option to request an original content of a cell to be restored. This option can be provided, for example, as a menu selection on the video display 250 and wherein the user chooses which cell will have its original content restored. For example, in response to a user request, the computer program 280 automatically restores the original content of cell "B1" to "3", based on the last result 542 of the formula 540 of cell "B1". The value "6" directly inputted into cell "C1" is maintained after the computer program 280 automatically restores the original content of cell "B1".

Figure 7:
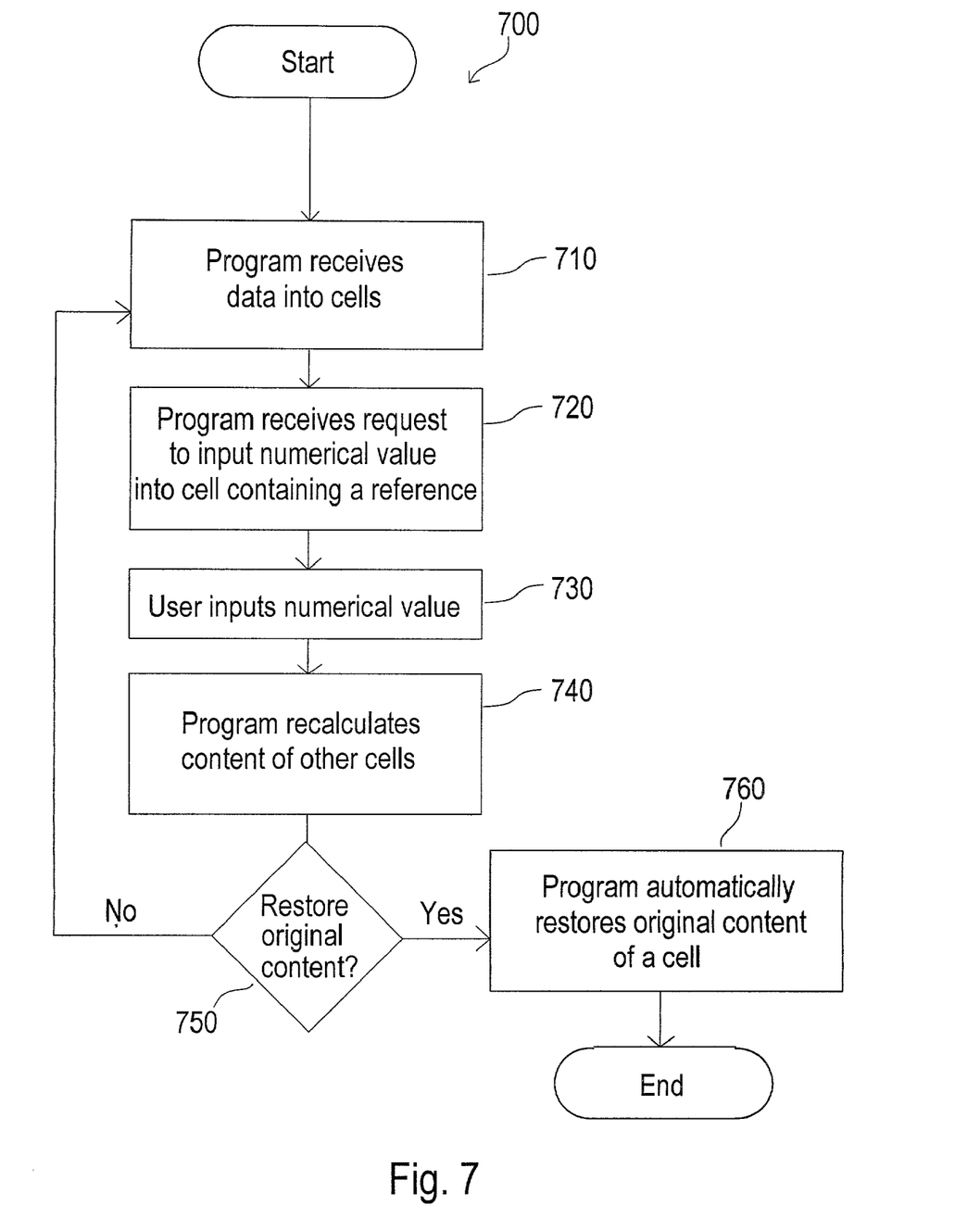
FIG. 7 depicts a flow diagram illustrating the steps performed for inputting data into the spreadsheet depicted in FIG. 5, in accordance with methods, systems, and articles of manufacture consistent with the first embodiment of the present invention.

FIG. 7 is a flow chart of a process 700 for inputting data into spreadsheet documents in accordance with an embodiment of the present invention. As illustrated, first, the computer program 280 receives data or formulas into the cells of a spreadsheet, such as spreadsheet 500 in FIG. 5 (step 710). The computer program 280 then receives an indication that the user requests to directly input a value into a cell containing a formula that references another cell (step 720). Referring to the above-described example, the user requests to directly input a value "4" into cell "B1". The user then directly inputs the value "4", which the computer program 280 stores as the last result 542 of cell "B1" (step 730).

To allow the user to input the value "4" into cell "B1" without deleting the formula 540, the user first inputs the value "4". The computer program 280 stores the inputted value "4" as the last result 542 of the cell "B1". The computer program 280 then sets the valid flag 544 to "valid" indicating that the last result 542 does not need to be recalculated and ensuring that the inputted value "4" is used. For all other formula cells "C1" and "D1" that depend on the modified cell "B1", the computer program 280 sets their valid flags 554 and 564, respectively, to "invalid" indicating that their last results 552 and 562 need to be recalculated as if any other change to cell "B1" had occurred.

The computer program 280 then recalculates the contents of the other cells of the spreadsheet (step 740). Steps 710 through 740 can be repeated for as many values that the user desires to directly input.

The user can then select an option to restore the original content of a particular cell (step 750). If the user selects this option, the computer program 280 automatically restores the original content of the particular cell by recalculating the last result based on the formula in the cell and storing that new result in the last result (step 760). In doing so, the computer program 280 does not disturb any values that have been directly inputted into other cells. Thus, the restoration is performed independently of the other cells.

Figure 8:
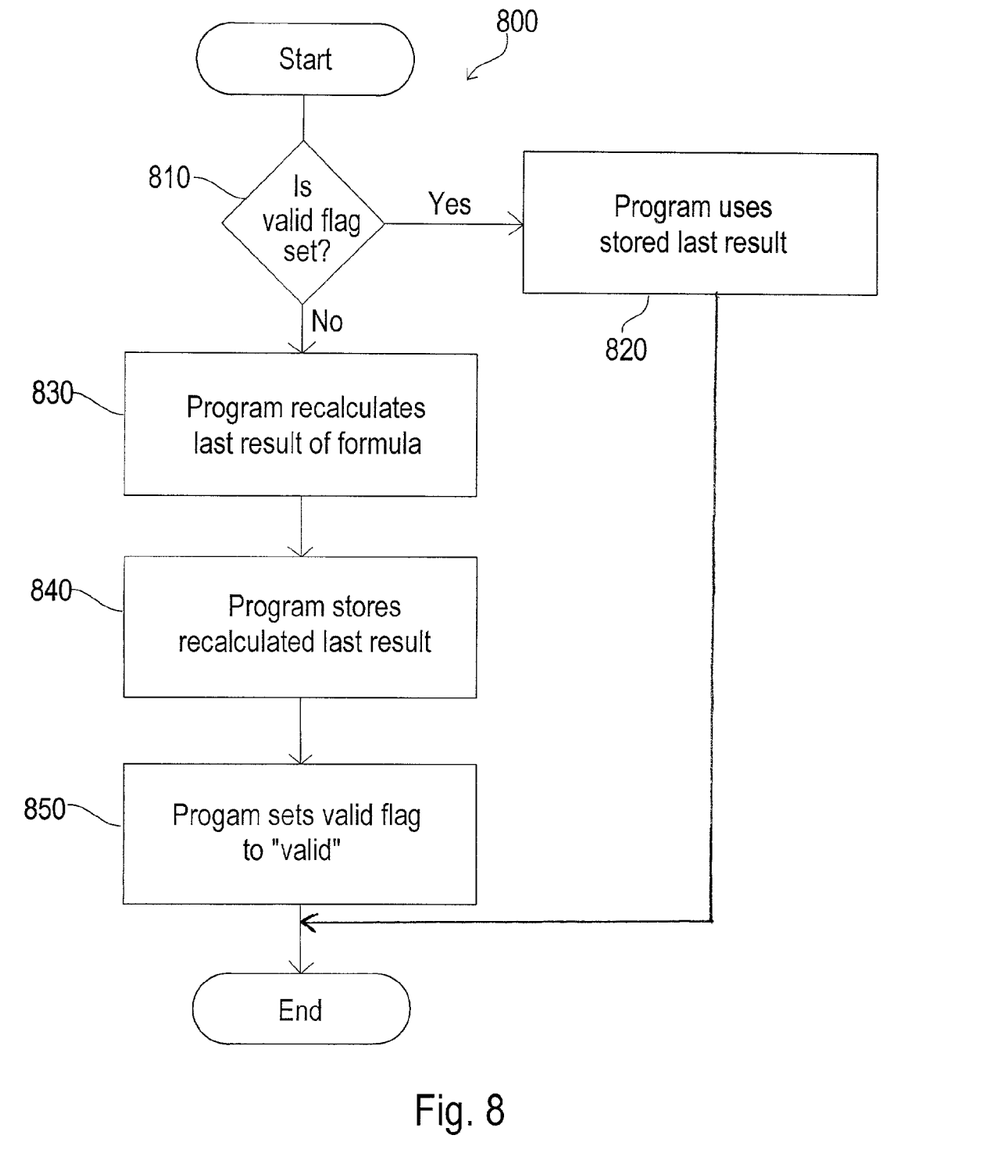
FIG. 8 depicts a flow diagram illustrating the steps performed when the last result value of a cell of a spreadsheet required for use in accordance with methods, systems, and articles of manufacture consistent with the present invention.

FIG. 8 depicts a flow chart of a process 800 in accordance with an embodiment of the present invention performed when the last result of a cell comprising a formula is required, for example to display the last result on the video display 250 or to use the last result value in a calculation for a formula of another cell. Referring to FIG. 5 as an example, when the computer program 280 requires the last result 552 of cell "C1", the computer program 280 first checks the valid flag 554 of cell "C1" to determine whether the valid flag 554 is set to "valid" (step 810). If the valid flag 554 is set to "valid", then the computer program 280 uses the stored last result 552 because it is ensured that a recalculation is not necessary (step 820). If the valid flag 554 is set to "invalid", then the computer program 280 recalculates the last result 552 of the formula 550 (step 830). The computer program 280 then stores a result of the calculation as the last result 552 (step 840). The computer program 280 then sets the valid flag 554 of that cell "C1" to "valid" indicating that the last result 552 does not need to be recalculated (step 850).

Figure 9:
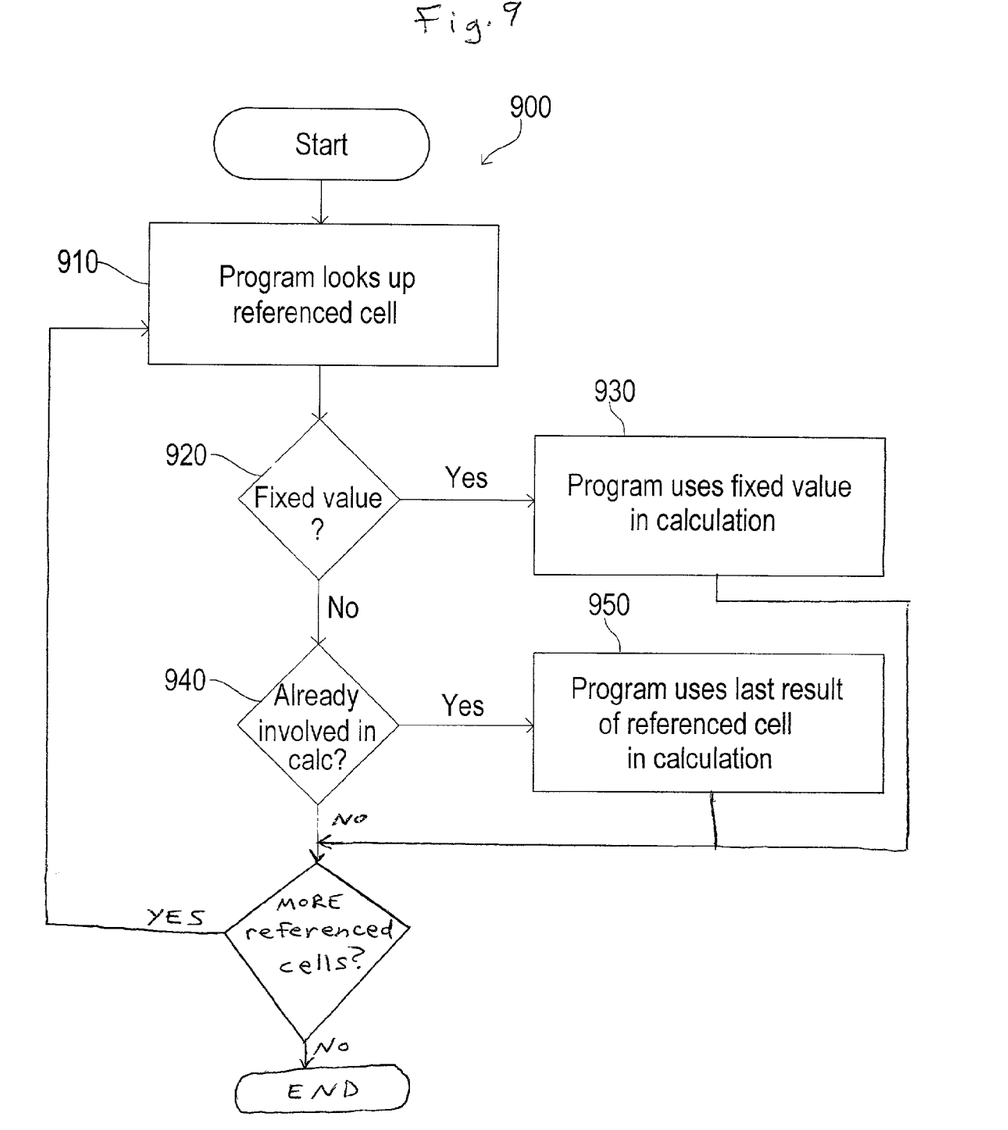
FIG. 9 depicts a flow diagram illustrating the step of recalculating a formula result for a cell of a spreadsheet in accordance with methods, systems, and articles of manufacture consistent with the present invention.

FIG. 9 depicts a flow chart of a process 900 in accordance with an embodiment of the present invention performed when calculating the last result of a cell comprising a formula that references another cell. The computer program 280 can perform process 900, for example, during step 740 of process 700 or step 830 of process 800. Referring to FIG. 3 as an example, when the computer program 280 calculates the last result 552 of cell "C1", which comprises a formula 550 that references cell "B1", the computer program 280 first looks up referenced cell "B1" (step 910). When the cell references multiple cells, the computer program 280 looks up each of the referenced cells. The computer program 280 then determines whether the formula 540 of the referenced cell "B1" comprises a fixed value or a formula (step 920). This determination is made because if the formula 540 contains references to other cells, then those cells will also need to be looked-up to calculate the last result 542. Accordingly, if the formula 540 of cell "B1" comprises a fixed value, the formula 540 does not contain a reference to another cell, and the computer program 280 then uses that fixed value (step 930). If the formula 540 of cell "B1" comprises a formula, however, the computer program 280 repeats the above procedure unless the referenced cell is already involved in a calculation that led to the computer program's 280 requesting the last result 552 of the current cell "C1" (step 940). In that case, the computer program 280 uses the referenced cell's last result, for example last result 542, even if its valid flag 544 is not set to "valid" (step 950). The last result 542 is used in that case in order to conclude the calculation and, thus, to avoid an infinite number of iterative calculation steps.

Figure 10:
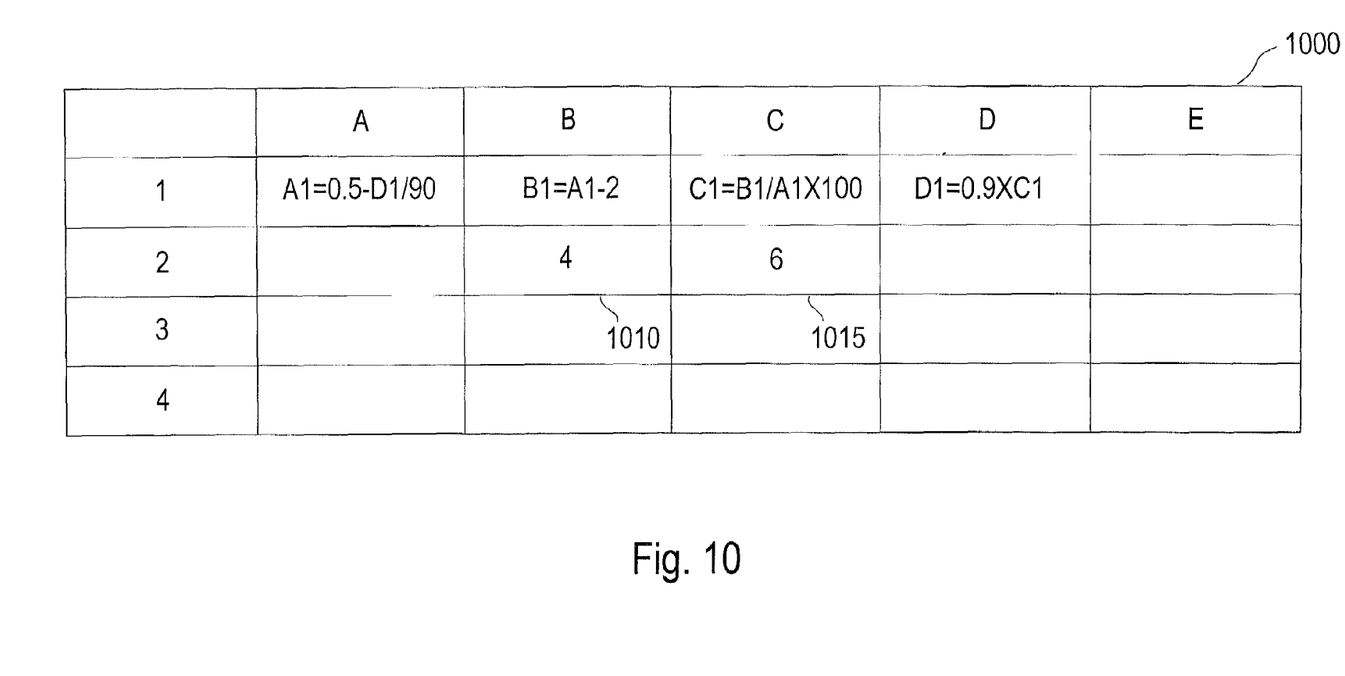
FIG. 10 depicts an example of data input into a spreadsheet in accordance with methods, systems, and articles of manufacture consistent with a second embodiment of the present invention.
Figure 11:
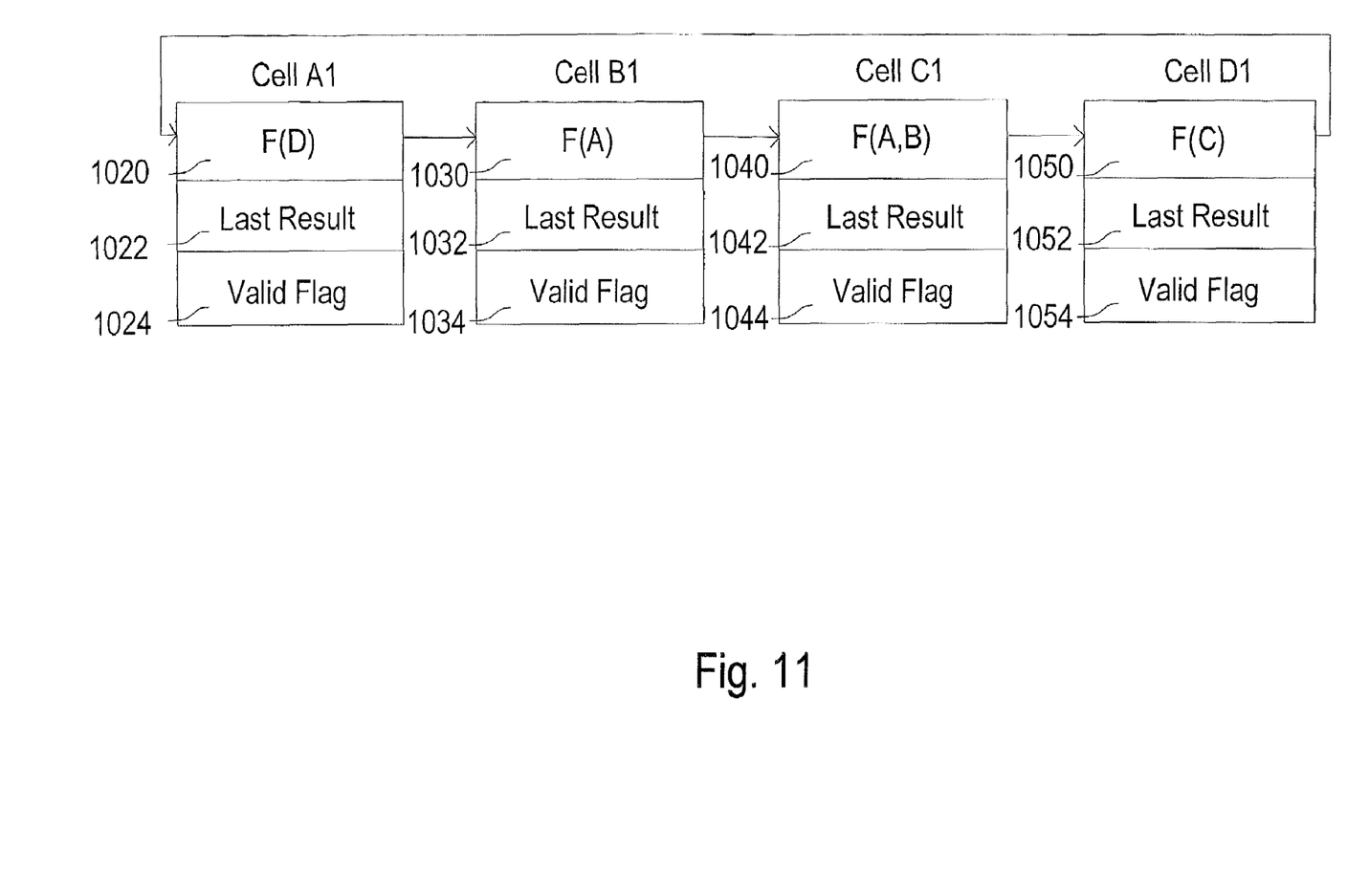
FIG. 11 depicts the dependencies of the individual cells of FIG. 10 in more detail in accordance with methods, systems, and articles of manufacture consistent with the present invention.

FIG. 10 depicts an alternative embodiment of a spreadsheet document 1000 as displayed on the video display 250, which is identical to the spreadsheet document 500 illustrated in FIG. 5, except the formula 1020 of cell "A1" now contains a reference to cell "D1". FIG. 11 depicts the data structure representing the spreadsheet. In the illustrated example, cell "A1" comprises the formula 1020, a last result 1022, and a valid flag 1024. Cell "B1" comprises a formula 1030, a last result 1032, and a valid flag 1044. Cell "C1" comprises a formula 1040, a last result 1042, and a valid flag 1044. Cell "D1" comprises a formula 1050, a last result 1052, and a valid flag 1054. The formula 1020 of cell "A1" contains a fixed value "5". The formula 1020 of cell "A1" is defined as "0.5" minus (the content of cell "D1" divided by "90"). The formulas of cells "B1", "C1", and "D1" are identical to those in spreadsheet document 500.

Thereby the cells "A1" to "D1" together form a "circular reference", each of them referencing another cell in the circle and being itself referenced by another cell in the circle.

In accordance with methods, systems, and articles of manufacture consistent with the present invention, the user can observe how the contents of cells, which reference a particular cell, change when a user directly inputs data into that particular cell, without deleting a reference to a cell already present in that particular cell. For example, the user can observe how the contents of cells "C1" and "D1" change if cell "B1" assumes a numerical value, for example "4", inputted by the user. For inputting the value "4" into cell "B1", after receiving a request by the user, the computer program 280 opens an input field 1020, which is highlighted and which enables the user to input value "4" for entry into cell "B1". If, for example, the user also requests to input a value "6" into cell "C1", the computer program 280 opens an input field 1015, which is highlighted and which enables the user to input a data value for entry into cell "C1".

With this configuration, when a value of "4" is inputted directly into cell "B1" in a manner similar to the manner explained in connection with FIG. 5, subsequently when the computer program 280 performs a recalculation, the last results 1042, 1052 and 1022 of all other cells "C1", "D1", and "A1" will change depending on the value inputted into the cell "B1". Also the computer program 280 will recalculate the last result 1032 of cell "B1" based on formula 1030. Assuming that no rounding error occurs, the last results of the cells in the circular reference will be self-consistent.

Therefore, when the user directly inputs data values into cells containing a reference, such as a formula or a function, it is particularly advantageous if those cells form part of a circular reference, since as explained above, subsequently a fully self-consistent set of cell contents can be attained.

Further, similar to the example described with respect to FIG. 5, in the example depicted in FIG. 10, the original content of a cell can be automatically restored by the computer program 280 regardless of whether further data values have been inputted into other cells or further recalculations have been performed. Further, as described above, the original content of a cell will be automatically restored by the computer program 280 while maintaining the further data values inputted into other cells.

In an embodiment of the present invention, the computer program 280 provides an option to the user to manually change a non-circular reference into a circular reference. If, for example, a user starts from a spreadsheet document 500 as shown in FIG. 5, and if the user wishes to "close the circle" by entering into cell "A1" a formula which makes it a part of a circular reference, the user may, for example, select a menu item "close circle". The computer program 280 then prompts the user to input a formula including the cells which should form a part of the circular reference. The computer program 280 can provide to the user an algebraic tool on the video display 250 for assisting the user with changing a non-circular reference into a circular reference. Thereafter, the computer program 280 will replace the formula 530 of cell "A1" by a suitable mathematical expression derived from the other cell definitions contained in the circular reference, thereby arriving at the formula 1020 for cell "A1" as shown in FIG. 10.

Instead of such an algebraic method of making the contents of the cells of a row of cells circular, the computer program 280 also provides an automatic approach in an embodiment. If for example in the case of FIG. 5, the new values for cells "C1" and "D1" have been calculated, the user selects a menu item on the video display 250 for, for example, "make row self-consistent". Each cell that is referenced by a cell "C1" and "D1" where a value has been directly input, such as the cell "A1" in the example of FIG. 2, would then be checked by the computer program 280 to determine whether its last result still matches with the newly inputted value. For that purpose, the formula contained in cell "B1" which has not been deleted and has not been overwritten by the value "4" is used by the computer program 280 to calculate "A1−2"="3", and the computer program 280 then recognizes that this does not match with the newly inputted value "4" in cell "B1". Thereafter, by any numerical method a new value for the content of cell "A1" is calculated by the computer program 280 to match with the new value of "4" of cell "B1" and which fits the formula cell "B1"="A1−2".

In an embodiment, for cells which form a part of a circular reference, the computer program 280 provides a predefined input option to directly input values into cells without overriding the formulas of the cells. This avoids the necessity for the user to choose a particular menu item for selecting this option. A user can therefore directly input values into cells containing formulas which form a part of a circular reference.

In an embodiment, the computer program 280 provides the predefined user setting as a selection from an option menu. This allows the user to either select the option of directly inputting values without overriding formulas in the cells as the defined setting, or select the option of "normally" input values that overrides the contents of the cells as the defined setting. In the latter case, the computer program 280 only provides this option to the user in a case of explicitly requesting the direct value input.

When the computer program 280 calculates the last result of a cell that is a part of a circular reference, the computer program 280 will typically issue an error message that the cell is a part of a circular reference. This is because the computer program 280 will otherwise be required to perform an iterative calculation, that will typically have an infinite number of iterative calculation steps.

In an embodiment, the computer program 280 provides the user with an option to limit the number of iterative calculation steps carried out during iterative calculations. The user selects the option to limit the number of iterative calculation steps to a finite number and enters the desired finite number. When the computer program 280 recalculates the last result of a cell that is a part of a circular reference, the computer program 280 will only performed the recalculations the finite number of times.

For example, referring to the example spreadsheet 1000 in FIG. 10, the user first selects the option to limit the number of iterative calculation steps to "2". When the last result 1020 of cell "A1" is calculated by the computer program 280, only two iterative calculation steps will be performed.

In an embodiment, the computer program 280 provides the user with an option to specify the degree of precision of the calculation of a last result of a cell of a circular reference. The user selects the option to specify the degree of precision and enters a minimum difference of a calculated last result from a previously calculated last result. When the computer program 280 recalculates the last result of a cell that is a part of a circular reference, the computer program 280 will perform iterative calculation steps until there is the minimum difference between a calculated last result of the cell and a previously calculated last result of the cell.

For example, referring to the example spreadsheet 1000 in FIG. 10, the user first selects the option to specify the degree of precision of the calculation and then specifies a minimum difference of "0.005". When the last result 520 of cell "A1" is calculated by the computer program 280, the computer program 280 will only perform iterative calculation steps until a difference between the calculated last result 520 of cell "A1" and a previously calculated last result of cell "A1" is less than or equal to "0.005".

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but methods, systems, and articles of manufacture consistent with the present invention may be implemented as a combination of hardware and software or in hardware alone. The invention may be implemented with both object-oriented and non-object-oriented programming systems. The scope of the invention is defined by the claims and their equivalents.

What is claimed is:

1. A method in a data processing system comprising a document with cells arranged in rows and columns, each cell comprising a formula and a last result, the method comprising the steps of:

receiving a plurality of values for a plurality of the cells; and storing the values in the last result of the plurality of the cells such that the values are used during recalculation instead of the formulas and such that each of the formulas for the plurality of the cells can be restored independently of other of the plurality of cells.

2. A computer-readable medium containing instructions that cause a data processing system to perform a method in a data processing system comprising a document with cells arranged in rows and columns, each cell comprising a formula and a last result, the method comprising the steps of:

receiving a plurality of values for a plurality of the cells; and storing the values in the last result of the plurality of the cells such that the values are used during recalculation instead of the formulas and such that each of the formulas for the plurality of the cells can be restored independently of other of the plurality of cells.

3. A computer-readable memory device encoded with a data structure with entries, each entry reflecting a cell in a spreadsheet that is recalculated by a spreadsheet program which is encoded in the memory device and which is run by a processor, each cell comprising:

a first storage area that stores a formula; and a second storage area that stores a numerical value that temporarily overrides the formula so that the numerical value is used instead of the formula during recalculation.

* * * * *